United States Patent
Heath et al.

(10) Patent No.: US 9,758,615 B2
(45) Date of Patent: Sep. 12, 2017

(54) PHASE-SEGMENTED NON-ISOCYANATE ELASTOMERS

(71) Applicant: DOW GLOBAL TECHNOLOGIES LLC, Midland, MI (US)

(72) Inventors: William Heath, Lake Jackson, TX (US); Phillip S. Athey, Lake Jackson, TX (US); Nathan Wilmot, Missouri City, TX (US); Harshad M. Shah, Missouri City, TX (US); Kamesh R. Vyakaranam, Pearland, TX (US); Nicole Knight, Rosharon, TX (US); Adam C. Colson, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 288 days.

(21) Appl. No.: 14/648,626

(22) PCT Filed: Dec. 18, 2013

(86) PCT No.: PCT/US2013/076236
§ 371 (c)(1),
(2) Date: May 29, 2015

(87) PCT Pub. No.: WO2014/100238
PCT Pub. Date: Jun. 26, 2014

(65) Prior Publication Data
US 2015/0315330 A1 Nov. 5, 2015

Related U.S. Application Data

(60) Provisional application No. 61/745,515, filed on Dec. 21, 2012.

(51) Int. Cl.
*C08G 59/14* (2006.01)
*C08G 59/66* (2006.01)
*C08G 59/68* (2006.01)
*C08L 63/00* (2006.01)

(52) U.S. Cl.
CPC ............ *C08G 59/14* (2013.01); *C08G 59/66* (2013.01); *C08G 59/68* (2013.01); *C08L 63/00* (2013.01)

(58) Field of Classification Search
CPC .................................................... C08G 59/14
See application file for complete search history.

(56) References Cited

U.S. PATENT DOCUMENTS

| | | | |
|---|---|---|---|
| 3,708,413 A | 1/1973 | Kehr | |
| 4,745,153 A * | 5/1988 | Hoffman | C08F 299/065 521/137 |
| 7,473,734 B2 | 1/2009 | Beckley | |
| 2005/0081994 A1 | 4/2005 | Beckley | |
| 2006/0050228 A1 | 3/2006 | Lai | |
| 2009/0047442 A1 | 2/2009 | Bowman | |
| 2009/0104448 A1 * | 4/2009 | Thompson | B32B 37/12 428/413 |
| 2010/0227949 A1 | 9/2010 | Tamai | |
| 2012/0157564 A1 * | 6/2012 | Kurata | C08F 2/48 522/182 |
| 2012/0214902 A1 * | 8/2012 | Detemmerman | C08L 83/04 523/122 |
| 2015/0291862 A1 * | 10/2015 | Krishnan | C08G 59/66 428/34 |
| 2015/0299379 A1 * | 10/2015 | Knight | C08G 59/066 528/90 |
| 2015/0299510 A1 * | 10/2015 | Knight | C09K 3/1012 427/386 |
| 2016/0304662 A1 * | 10/2016 | Colson | C08G 59/1466 |

FOREIGN PATENT DOCUMENTS

| | | |
|---|---|---|
| EP | 1970408 A | 9/2008 |
| GB | 1460571 A | 1/1977 |

OTHER PUBLICATIONS

Chan, European Polymer J. 45 (2009), 2717-2745.
Chan, Macromolecules 2010, 43, 6381-6388.
Shin, Macromolecules 2009, 42, 3294-3301.
Williams, J. Polymer Science: Part A: Polymer Chemistry 45 4118-4128 (2007).
Senyurt, Macromolecules 2007, 40, 4901-4909.
Ortiz,Macrolmol. Mater. Eng. 2008, 293,737-739.
Sangermano, Polym. Int. 2010, 59, 1045-1051.
Carioscia, Polymer 48 (2007) 1526-1532.

* cited by examiner

*Primary Examiner* — Megan McCulley

(57) ABSTRACT

Elastomers are prepared from a reaction mixture that contains a polyene compound, an epoxy resin, a thiol curing agent and a basic catalyst. The polyene compound has an average of at least two groups containing aliphatic carbon-carbon double bonds capable of reaction with a thiol group. At least one of said aliphatic carbon-carbon double bonds is separated from each other said aliphatic carbon-carbon double bond by an aliphatic spacer group having a weight of at least 500 atomic mass units. These elastomers are typically phase-separated materials having good elongation and tensile properties.

16 Claims, No Drawings

PHASE-SEGMENTED NON-ISOCYANATE ELASTOMERS

This invention relates to phase-segmented non-isocyanate elastomers.

Elastomeric (rubbery) polymers are in widespread use, in a wide variety of applications. Elastomeric polymers are used to manufacture tires, many types of seals, gaskets, tubing, flexible pipes and hoses, sleeves and covers for mechanical equipment, air management ducts, diaphragms, protective coatings for many substrates, shoe soles, wheels, impact absorbers, caulks and sealants, flexible spacers, and a wide range of cushioning products.

At first, elastomeric products such as these were made by vulcanizing natural rubber. Over time, various synthetic elastomeric polymers have been developed, including, for example, neoprene and isoprene rubbers, butyl rubbers, nitrile rubbers, various acrylate rubbers, butadiene polymer and copolymers. These are all high molecular weight materials that can be produced economically only in large industrial processes. In addition, these polymers must be melt-processed to form parts. The need to manufacture these polymers at large scale, and the further need to melt-process these polymers, restricts them from being used in certain applications. For example, many in-field applications require the elastomeric polymer to be formed and shaped at the point of use. Sealants are an illustration of this; many sealants must be applied as a liquid or semi-liquid material, which then must harden in place. In such instances, it is often impractical to use a thermoplastic material, as the necessary melt-processing equipment is either not available on-site or else cannot be adapted either technologically or economically to the specific application. Because of the expense of the necessary processing equipment, polymers that require melt-processing usually are limited to applications in which the part can be pre-formed in large quantities.

Another problem with these elastomeric materials is although they exhibit very high elongations, they tend to have low tensile strength and tensile modulus. For many applications, they do not have the strength that is needed; they may be, for example, too elastic and/or too compressible. This can be overcome by, for example, loading the polymer with fillers or by employing various cross-linking strategies, but this only adds complexity and further limits the applications for which the polymers can be used.

The other main class of large volume, elastomeric polymers is the polyurethanes. Unlike the other large volume elastomeric polymers, polyurethanes can be produced easily and inexpensively at virtually any scale through the reaction of low molecular weight precursors. Through the judicious selection of starting materials and catalysts, these precursors can be caused to react at low to moderate temperatures, sometimes even at ambient conditions, to form a high molecular weight, strong elastomeric material. These attributes make polyurethanes the material of choice in many applications for which melt-processable polymers are not suitable. These include, for example, many in-field coating and sealant applications and many small volume applications.

Another strength of the polyurethanes is their immense versatility. Just as the reactivity of polyurethane systems can be "tuned" through the selection of starting materials and catalysts to accommodate a wide range of processing conditions, so too can the properties of the elastomers be adjusted to render them suitable for a wide range of applications. Polyurethanes can be formed as very soft, very high elongation materials, as very hard, high glass transition temperature resins, and virtually anything in between. They can be formulated to produce thermoplastic or thermosetting polymers. When crosslinked, the crosslink density is easily variable over a wide range. In addition, polyurethanes are easily formed into non-cellular bodies as well as cellular materials whose density can range to as low about 16 kg/m$^3$.

This versatility is largely due to the chemistry of isocyanate groups. Polyurethane chemistry is based on the reactions of isocyanate groups with species (such as hydroxyl groups and amino groups) that contain active hydrogen atoms. The reaction of an isocyanate group with an alcohol or a primary or secondary amine produces urethane or urea linkages, respectively. In addition, a molecule of water can react with two isocyanate groups to produce a urea linkage (with liberation of a molecule of carbon dioxide). These reactions are facile, form few if any byproducts (except for carbon dioxide produced in the water/isocyanate reaction) and are surprisingly predictable, given that isocyanate groups can react with themselves and with urethane and urea groups to form a variety of structures. Fortunately, these additional reactions in most cases proceed only to a limited extent (unless the system is specially formulated or processed to promote them), and the polymer produced is highly predictable in terms of structure and morphology.

Unlike many of the melt-processable elastomeric materials, polyurethane elastomers are readily produced with both good elongation and high strength. This is again attributable to unique aspects of the isocyanate chemistry. When elastomeric polyurethanes are produced, a polyisocyanate is reacted with two different types of isocyanate-reactive materials. The first of these is a longer chain, flexible material such as certain hydroxyl-terminated polyethers, polycarbonates, polyesters and or polybutadienes. The second type of isocyanate-reactive material is a chain extender or crosslinker. The chain extender or crosslinker is a short-chain polyol or polyamine, or even water in some cases. A portion of the isocyanate groups reacts with the longer chain, flexible material, and another portion reacts with the chain extender or crosslinker.

When the polyisocyanate reacts with the chain extender, a polymeric segment forms which contains two or more closely-spaced urethane or urea groups. The urethane and urea groups are capable of forming hydrogen bonds with each other, and in doing so can produce small domains of highly hydrogen-bonded material dispersed in the longer chain, flexible material (which also becomes bonded into the polymer chain). It is the formation of these highly hydrogen-bonded domains and their ability to phase segregate from the longer chain, flexible material that gives polyurethanes their combination of elongation and tensile strength. The highly hydrogen-bonded domains are commonly known as the "hard segment" of the elastomer, whereas the phase made up of mostly the longer chain flexible material is commonly known as the "soft segment".

The formation of these hard and soft segments is further complicated by the need to maintain uniformity, on a macro scale, throughout the mass of polymer that is produced. This generally means that the precursors, when first mixed, must form a highly homogeneous mixture that does not grossly phase separate until the urethane- and/or urea-forming reactions are well underway. Premature phase separation would lead to the formation of large-scale (>10 µm) domains in the polymer, which would in turn lead to poorer performance and inconsistent properties throughout the part. Inadequate phase separation results in a large loss of tensile strength. Polyurethane chemistry is unique in that the starting materials have the necessary miscibility, or can be easily modified to have the right miscibility, and the rate and sequencing of the various curing reactions are such that the phase segregation needed to produce adequate tensile properties together with good elongation, all in a system that has a low initial viscosity and cures rapidly at ambient or only moderately elevated temperatures.

A problem with polyurethanes is that, although the isocyanate chemistry is central to its benefits, there are potential worker exposure concerns if polyisocyanate compounds are not handled properly.

One way to limit human exposure to isocyanate compounds, of course, would be to provide an alternate, curable polymer system that does not contain free isocyanate compounds. However, there is currently no other polymer system available that offers the advantages of rapidly curing from liquid, low viscosity precursors at ambient or at most moderately elevated temperatures, of being suited for small-scale, in-field applications (while also being entirely suitable for large industrial-scale part production) and of forming an elastomeric material that has a good combination of elongation and tensile strength.

Thiol-ene chemistry has been proposed as a route to making polymers from low viscosity precursors. The thiol-ene reaction can proceed extremely rapidly under some conditions and, as an addition reaction, does not produce reaction by-products that need to be removed. However, thiol-ene systems that cure to form elastomeric materials with properties similar to those of polyurethane elastomers have not been developed. The thiol-ene materials are mostly hard, glassy polymers having very low elongation.

Some attempts have been made to extend the properties of thiol-ene polymers by forming thiol-ene/epoxy hybrids. For example, Sangermano et al. in "Preparation and characterization of hybrid thiol-ene/epoxy UV-thermal dual-cured systems", *Polym. Int.* 2010:50:1046-1051, describe an attempt to make such hybrids. The products are not elastomeric. They have a single glass transition temperature in the range of 16-25° C. by dynamic mechanical thermal analysis. Carioscia et al., "Evaluation and control of thiol-ene/thiol-epoxy hybrid networks", Polymer 48 (2007) 1526-1532, describe thiol-ene/thiol-epoxy interpenetrating network systems for dental applications. These are not elastomeric, either. They have single glass transition temperatures of approximately 71-75° C.

Shin, et al., Segmented Polythiourethane Elastomers through Sequential Thiol-Ene and Thiol-Isocyanate Reactions, *Macromolecules* 2009, 42, 3294-3301, describe elastic polythiourethanes. These were synthesized by producing a thiol-terminated prepolymer by the phosphine-catalyzed thiol-ene reaction between 1,6-hexanedithiol and 1,4-butanediol diacrylate, and then chain-extending the prepolymer with a polyisocyanate compound. This synthesis is performed in solution and the product is isolated via precipitation. As such this is not an industrially viable process.

This invention is in one aspect a process for forming an elastomeric polymer, comprising a) forming a reaction mixture containing 1) at least one polyene compound having an average of at least two groups containing aliphatic carbon-carbon double bonds capable of reaction with a thiol group, wherein at least one of such aliphatic carbon-carbon double bonds is separated from each other said aliphatic carbon-carbon double bond by an aliphatic spacer group having a weight of at least 1000 atomic mass units, 2) from 20 to 150 parts by weight, per 100 parts by weight of component 1), of at least one epoxy resin having an average of at least 1.5 epoxide groups per molecule and an epoxy equivalent weight of up to 1000, 3) at least one curing agent having at least two thiol groups, and 4) at least one basic catalyst, and b) curing the reaction mixture to form the polymeric elastomer.

The invention provides a versatile, non-isocyanate route to make elastomeric polymers that have very useful properties. The invention is versatile from a processing standpoint, as the reaction mixture can be adapted to cure under a wide range of conditions through the selection of particular starting materials and catalysts. Often, the reactants polymerize spontaneously even at room temperature and can cure without applied heat to form an elastomer having useful properties. This attribute is very beneficial in certain applications, especially certain in-field sealant and adhesive uses. Alternatively, the reaction mixture can be formulated to cure slowly until exposed to specific conditions such as an elevated temperature and in some cases a source of free radicals.

Similarly, the properties of the resulting elastomer are easily varied to produce products having properties adapted to particular applications.

The polyene compound has at least two aliphatic carbon-carbon double bonds ("ene groups") capable of engaging in a thiol-ene addition reaction. At least one of these ene groups is spaced apart from each of the other ene groups by a flexible aliphatic spacer group having a weight of at least 1000 atomic mass units. It is preferred that each of these ene groups is spaced apart from each of the others by such a flexible aliphatic spacer group. The ene groups preferably are terminal, i.e., at the ends of the molecular chains.

The polyene preferably has no more than 8, more preferably no more than 6, still more preferably no more than 4 ene groups.

The ene groups are aliphatic or, less preferably, alicyclic carbon-carbon double bonds in which a hydrogen atom is bonded to at least one of the carbon atoms. The carbon-carbon double bonds can take the form:

wherein R, R' and R" are independently hydrogen or an organic substituent, which organic substituent may be substituted, provided at least one of R, R' and R" is a hydrogen atom. Any of R, R' and R" may be, for example, alkyl or substituted alkyl group having up to 12, preferably up to 4 and more preferably up to 3 carbon atoms. R is preferably hydrogen or methyl. It is preferred that R' and R" are each hydrogen and more preferred that R, R' and R" are all hydrogen.

In some embodiments, the ene groups are provided in the form of terminal αβ-unsaturated carboxylate groups, such as, for example, acrylate (—O—C(O)—CH═CH$_2$) groups or methacrylate (—O—C(O)—C(CH$_3$)═CH$_2$) groups. In some embodiments, the ene groups are terminal vinyl (—CH═CH$_2$) groups. The vinyl groups may be vinylaryl groups, in which the vinyl group is bonded directly to a ring carbon of an aromatic ring such as a phenyl ring. In some embodiments, the ene groups are terminal allyl (—CH$_2$—CH═CH$_2$) groups. The polyene compound may have ene groups of different types, or all of the ene groups can be the same.

The spacer groups each have a weight of at least 1000 atomic mass units, preferably at least 1500 atomic mass units, more preferably at least 2000 atomic mass units, still more preferably at least 3000 atomic mass units and in some embodiments at least 4000 atomic mass units. The weight of the flexible spacer groups may be as much as 20,000, and preferably is up to 12,000, more preferably up to 8000. The spacer groups each preferably include at least one chain having a mass of at least 1000 atomic mass units which, upon curing, produces in the resulting elastomer an elastomeric phase having a glass transition temperature of no greater than −20° C., preferably no greater than −35° C. and more preferably no greater than −40° C.

The spacer groups are aliphatic. Preferred aliphatic spacer groups include groups that contain sequences of linear or branched aliphatic carbon-carbon single bonds and/or non-conjugated double bonds, aliphatic ether bonds, aliphatic amine bonds, and/or other like bonds within their main chain. Such sequences may be, for example at least 5 atoms or at least 10 atoms in length and may be up to several hundred atoms in length. These sequences may be interspersed with various linking groups such as amide, urethane, urea, ester, imide carbonate and the like. These sequences may be interspersed with aromatic groups, provided that such aromatic groups preferably constitute no more than 25%, preferably no more than 5% of the weight of the aliphatic spacer group.

In preferred embodiments, each of the spacer groups contains an aliphatic polyether chain, which may form all or a portion such spacer groups. The aliphatic polyether chain that preferably has a weight of at least 1500, more preferably at least 2000, still more preferably at least 3000, and in some embodiments at least 4000, to as much as 20,000, preferably up 12,000 and more preferably up to 8,000 g/mol. The polyether chain may be, for example, a polymer of ethylene oxide, 1,2-propylene oxide, 1,2-butylene oxide, 2,3-butylene oxide, tetramethylene oxide, and the like. It has been found that polyether chains having side groups, such as, for example, polymers of 1,2-propylene oxide, 1,2-butylene oxide, 2,3-butylene oxide and the like, provide particularly good results in forming a phase-segregated polymer having good properties. An especially preferred spacer group contains a poly(1,2-propylene oxide) chain or a random propylene oxide-co-ethylene oxide chain in which the ethylene oxide chain contains up to 40%, preferably up to 25%, more preferably up to about 15%, by weight copolymerized ethylene oxide. Such especially preferred spacer groups may have terminal poly(ethylene oxide) segments, provided that such segments should not in the aggregate constitute more than 40%, preferably not more than 25% and more preferably not more than 15% of the total weight of the polyether.

A preferred class of polyene compounds are ene-terminated polyethers, especially ene-terminated polyethers having a molecular weight of at least 2000 (preferably at least 4000) up to 12,000 (preferably up to 8,000) and from 2 to 8, preferably 2 to 6 or 2 to 4 ene groups per molecule. There are several approaches to making those materials. One approach involves capping the hydroxyl groups of a polyether polyol with an ene compound that also has a functional group that reacts with a hydroxyl group to form a bond to the end of the polyether chain. Examples of such capping compounds include ene-containing isocyanate compounds include, for example, 3-isopropenyl-α,α-dimethylbenzylisocyanate (TMI) or isocyanatoethylmethacrylate (IEM). Ene-terminated polyethers also can be prepared by capping a polyether polyol with an ethylenically unsaturated halide such as vinyl benzyl chloride, an ethylenically unsaturated siloxane such as vinyltrimethoxylsilane, or an ethylenically unsaturated epoxide compound.

Another approach to making an ene-terminated polyether is to cap a polyether polyol as described before with a polyisocyanate compound, preferably a diisocyanate. The polyisocyanate may be, for example, an aromatic polyisocyanate such as diphenylmethane diisocyanate or toluene diisocyanate or an aliphatic polyisocyanate such as isophorone diisocyanate, hexamethylene diisocyanate, hydrogenated toluene diisocyanate, hydrogenated diphenylmethane diisocyanate, and the like. This produces a prepolymer that contains urethane groups and terminal isocyanate groups. The isocyanate groups are then capped by reaction with an isocyanate-reactive capping compound having a hydroxyl group and an ene group as described before. Examples of such isocyanate-reactive capping compounds include, for example, allyl alcohol, vinyl alcohol and hydroxyalkylacrylate and/or hydroxyalkylmethacrylate compounds such as hydroxyethylacrylate and hydroxyethylmethacrylate.

The polyether polyol used to make the preferred ene-terminated polyether in some embodiments has no more than 50 μeq/g of terminal unsaturation. Terminal unsaturation in a polyether polyol is indicative of the presence of monofunctional polyether species in the product. Therefore, lower amounts of terminal unsaturation indicate that the product has a lower quantity of monofunctional polyether species. The monofunctional polyether species are understood to form when the alkylene oxide (especially propylene oxide) isomerizes to form allyl alcohol and/or propenyl alcohol, which are monoalcohols that become alkoxylated to form monofunctional molecules. The level of terminal unsaturation may be, for example, less than 20 μeq/g, less than 10 μeq/g, less than 7 μeq/g or less than 5 μeq/g.

The selection of polymerization conditions and/or polymerization catalyst has a large effect on the amount of terminal unsaturation that forms during polyether polyol manufacturing. When using strongly alkaline catalyst such as alkali metal hydroxides, lower amounts of terminal unsaturation can be obtained by conducting the polymerization at low to moderate temperatures. Alternatively, weakly alkaline or non-alkaline polymerization catalysts can be used. One such alternative polymerization catalyst is a double metal cyanide (DMC) catalyst complex as described, for example, in any of U.S. Pat. Nos. 3,278,457, 3,278,458, 3,278,459, 3,404, 109, 3,427,256, 3,427,334, 3,427,335 and 5,470,813. A preferred type is a zinc hexacyanocobaltate catalyst complex. The DMC catalyst complex may be complexed with an alcohol such as t-butanol and/or a polyether polyol. Polymers of propylene oxide made with DMC catalysts exhibit suitable low levels of monofunctional species.

The epoxy resin is one or more materials having an average of at least 1.5, preferably at least 1.8 epoxide groups per molecule, and an epoxy equivalent weight of up to 1000. The epoxy equivalent weight preferably is up to 500, more preferably is up to 250 and still more preferably up to 225. The epoxy resin preferably has up to eight epoxide groups and more preferably has 1.8 to 4, especially 1.8 to 3, epoxide groups per molecule.

The epoxy resin is preferably a liquid at room temperature, to facilitate easy mixing with other components. However, it is possible to use a solid (at 25° C.) epoxy resin, particularly if the epoxy resin is soluble in the polyene compound, and/or if the epoxy resin is provided in the form of a solution in a suitable solvent.

Among the useful epoxy resins include, for example, polyglycidyl ethers of polyphenolic compounds, by which it is meant compounds having two or more aromatic hydroxyl (phenolic) groups. One type of polyphenolic compound is a diphenol (i.e., has exactly two aromatic hydroxyl groups) such as, for example, resorcinol, catechol, hydroquinone, biphenol, bisphenol A, bisphenol AP (1,1-bis(4-hydroxylphenyl)-1-phenyl ethane), bisphenol F, bisphenol K, tetramethylbiphenol, or mixtures of two or more thereof. The polyglycidyl ether of such a diphenol may be advanced, provided that the epoxy equivalent weight is about 1000 or less, preferably about 250 or less and more preferably about 225 of less.

Suitable polyglycidyl ethers of polyphenols include those represented by structure (I)

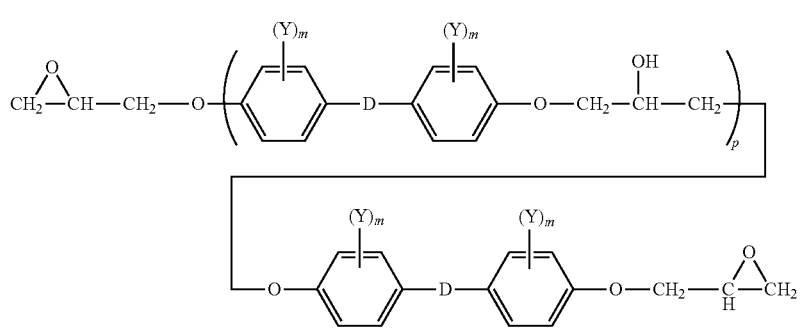

(I)

wherein each Y is independently a halogen atom, each D is a divalent hydrocarbon group suitably having from 1 to about 10, preferably from 1 to about 5, more preferably from 1 to about 3 carbon atoms, —S—, —S—S—, —SO—, —$SO_2$—, —$CO_3$—, —CO— or —O—, each m may be 0, 1, 2, 3 or 4 and p is a number such that the compound has an epoxy equivalent weight of up to 1000, preferably 170 to 500 and more preferably 170 to 225. p typically is from 0 to 1, especially from 0 to 0.5.

Fatty acid-modified polyglycidyl ethers of polyphenols, such as D.E.R. 3680 from The Dow Chemical Company, are useful epoxy resins.

Other useful polyglycidyl ethers of polyphenols include epoxy novolac resins. The epoxy novolac resin can be generally described as a methylene-bridged polyphenol compound, in which some or all of the phenol groups are capped with epichlorohydrin to produce the corresponding glycidyl ether. The phenol rings may be unsubstituted, or may contain one or more substituent groups, which, if present are preferably alkyl having up to six carbon atoms and more preferably methyl. The epoxy novolac resin may have an epoxy equivalent weight of about 156 to 300, preferably about 170 to 225 and especially from 170 to 190. The epoxy novolac resin may contain, for example, from 2 to 10, preferably 3 to 6, more preferably 3 to 5 epoxide groups per molecule. Among the suitable epoxy novolac resins are those having the general structure:

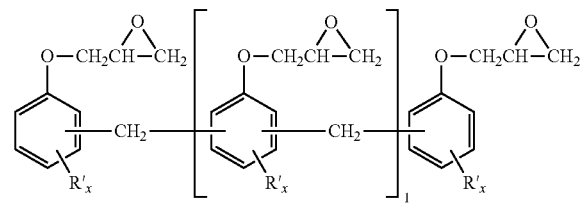

in which l is 0 to 8, preferably 1 to 4, more preferably 1 to 3, each R' is independently alkyl or inertly substituted alkyl, and each x is independently 0 to 4, preferably 0 to 2 and more preferably 0 to 1. R' is preferably methyl if present.

Other useful polyglycidyl ethers of polyphenol compounds include, for example, tris(glycidyloxyphenyl)methane, tetrakis(glycidyloxyphenyl)ethane, and the like.

Still other useful epoxy resins include polyglycidyl ethers of polyols, in which the epoxy equivalent weight is up to 1000, preferably up to 500, more preferably up to 250, and especially up to 200. These may contain 2 to 6 epoxy groups per molecule. The polyols may be, for example, alkylene glycols and polyalkylene glycols such as ethylene glycol, diethylene glycol, tripropylene glycol, 1,2-propane diol, dipropylene glycol, tripropylene glycol and the like as well as higher functionality polyols such as glycerin, trimethylolpropane, trimethylolethane, pentaerythritol, sorbitol and the like. These preferably are used together with an aromatic epoxy resin such as a diglycidyl ether of a biphenol or an epoxy novolac resin.

Still other useful epoxy resins include tetraglycidyl diaminodiphenylmethane; oxazolidone-containing compounds as described in U.S. Pat. No. 5,112,932; cycloaliphatic epoxides; and advanced epoxy-isocyanate copolymers such as those sold commercially as D.E.R.™ 592 and D.E.R.™ 6508 (The Dow Chemical Company) as well as those epoxy resins described, for example, in WO 2008/140906.

20 to 150 parts by weight of epoxy resin(s) may be provided to the reaction mixture, per 100 parts by weight of the ene compound(s) (component 1) above). The amount of epoxy resin, relative to the ene compound(s), can be varied as needed to adjust the properties of the elastomer. This ratio of epoxy resin to ene compound has been found to provide an elastomer having a combination of high elongation (at least 50% and in many cases at least 100%) and good tensile strength (at least 2100 kPa (about 300 psi), preferably at least 3500 kPa (about 500 psi). Within this broad range, elongation generally decreases with an increasing amount of epoxy resin while tensile strength and modulus tend to increase. When the amount of epoxy resin is within the foregoing range, the epoxy resin tends to cure to form a discontinuous resin phase dispersed in a continuous phase constituted mainly by the cured ene compound (component 1)).

If a greater amount of the epoxy resin is provided, a phase inversion often is seen, in which the cured epoxy resin mainly constitutes a continuous phase of the final polymer, resulting in a low elongation product having properties similar to conventional toughened epoxy resins. To avoid forming such a low elongation material, it is preferred to provide no more than 125 parts by weight of epoxy resin(s) per 100 parts by weight of the ene compound(s) (component 1)). A more preferred amount is up to 110 parts by weight epoxy resin(s) per 100 parts by weight of the ene compounds (component 1)), and a still more preferred amount is up to 75 parts. The preferred lower amount is at least 25 or at least 40 parts by weight epoxy resin per 100 parts by weight of the ene compound(s) (component 1)).

The reaction mixture further contains at least one polythiol that can react with both the ene groups of the ene compound (component 1)) and the epoxy groups of the epoxy resin(s) to form a high molecular weight polymer.

The polythiol curing agent contains at least two thiol groups. The polythiol preferably has an equivalent weight per thiol group of up to 500, more preferably up to 200 and still more preferably up to 150. This polythiol compound may contain up to 8, preferably up to 4 thiol groups per molecule.

Among the suitable polythiol compounds are mercaptoacetate and mercaptopropionate esters of low molecular weight polyols having 2 to 8, preferably 2 to 4 hydroxyl groups and an equivalent weight of up to about 75, in which all of the hydroxyl groups are esterified with the mercaptoacetate and/or mercaptopropionate. Examples of such low molecular weight polyols include, for example, ethylene glycol, diethylene glycol, triethylene glycol, 1,2-propane diol, 1,3-propane diol, dipropylene glycol, tripropylene glycol, 1,4-butane diol, 1,6-hexane diol, glycerin, trimethylolpropane, trimethylolethane, erythritol, pentaerythritol, sorbitol, sucrose and the like.

Other suitable polythiol compounds include alkylene dithiols such as 1,2-ethane dithiol, 1,2-propane dithiol, 1,3-propanedithiol, 1,4-butane dithiol, 1,6-hexane dithiol and the like, trithiols such as 1,2,3-trimercaptopropane, 1,2,3-tri(mercaptomethyl)propane, 1,2,3-tri(mercaptoethyl)ethane, (2,3-di((2-mercaptoethyl)thio)1-propanethiol, and the like. Yet another useful polythiol compound is a mercapto-substituted fatty acid having at least 2 mercapto substituents on the fatty acid chains, such as, for example, that having the structure:

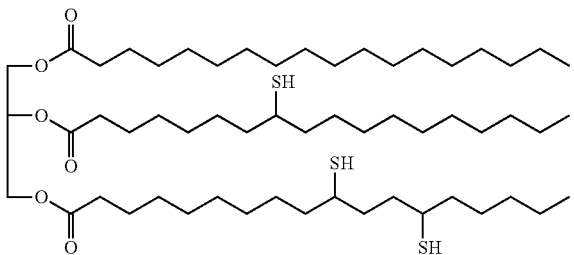 [SMILES: CCCCCCCCCCCCCCCCCC(=O)OCC(COC(=O)CCCCCCCCC(S)CCC(S)CCCCC)OC(=O)CCCCCCC(S)CCCCCCCCCC]

The amount of curing agent used can vary widely, depending on the properties that are wanted in the cured product, and in some cases depending on the type of curing reactions that are desired. The maximum amount of curing agent typically provides up to 1.25 equivalents, preferably up to 1.15 equivalents and in some cases up to 1.05 equivalents of thiol groups per equivalent of ene and epoxy groups. Larger excesses of the curing agent tend to degrade polymer properties. Because the epoxy resin(s) can polymerize with themselves and in many cases the ene compound also is capable of self-polymerization, it is possible to provide a large excess of epoxy and/or ene groups in the reaction mixture. Thus, for example, as few as 0.1, as few as 0.25 or as few as 0.5 equivalents of thiol groups in the curing agent can be provided per equivalent of epoxy and ene groups.

In some embodiments, the amount of curing agent is close to stoichiometric, i.e., the total number of thiol and/or amine hydrogen equivalents is somewhat close to the combined number of equivalents of epoxy and ene groups provided to the reaction mixture. Thus, for example, 0.75 to 1.25 equivalents, from 0.85 to 1.15 equivalents or from 0.85 to 1.05 equivalents of thiol groups can be provided by the curing agent per equivalent of epoxide and ene groups present in the reaction mixture.

The reaction mixture contains at least one basic catalyst. For purposes of this invention, a basic catalyst is a compound that is capable of directly or indirectly extracting a hydrogen from a thiol group to form a thiolate anion. In some embodiments, the basic catalyst does not contain thiol groups and/or amine hydrogens. The catalyst preferably is a material having a pKa of at least 5, preferably at least 10.

Among useful types of catalysts include inorganic compounds such as salts of a strong base and a weak acid, of which potassium carbonate and potassium carboxylates are examples, various amine compounds, and various phosphines.

Suitable amine catalysts include various tertiary amine compounds, cyclic or bicyclic amidine compounds such as 1,8-diazabicyclo-5.4.0-undecene-7, tertiary aminophenol compounds, benzyl tertiary amine compounds, imidazole compounds, or mixtures of any two or more thereof.

Tertiaryaminophenol compounds contain one or more phenolic groups and one or more tertiary amino groups. Examples of tertiary aminophenol compounds include mono-, bis- and tris(dimethylaminomethyl)phenol, as well as mixtures of two or more of these. Benzyl tertiary amine compounds are compounds having a tertiary nitrogen atom, in which at least one of the substituents on the tertiary nitrogen atom is a benzyl or substituted benzyl group. An example of a useful benzyl tertiary amine compound is N,N-dimethyl benzylamine.

Imidazole compounds contain one or more imidazole groups. Examples of imidazole compounds include, for example, imidazole, 2-methylimidazole, 2-ethyl-4-methylimidazole, 2-undecylimidazole, 2-heptadecylimidazole, 2-phenylimidazole, 2-phenyl-4-methylimidazole, 1-benzyl-2-methylimidazole, 2-ethylimidazole, 2-isopropylimidazole, 2-phenyl-4-benzylimidazole, 1-cyanoethyl-2-undecylimidazole, 1-cyanoethyl-2-ethyl-4-methylimidazole, 1-cyanoethyl-2-undecylimidazole, 1-cyanoethyl-2-isopropylimidazole, 1-cyanoethyl-2-phenylimidazole, 2,4-diamino-6-[2'-methylimidazolyl-(1)']ethyl-s-triazine, 2,4-diamino-6-[2'-ethylimidazolyl-(1)']ethyl-s-triazine, 2,4-diamino-6-[2'-undecylimidazolyl-(1)']ethyl-s-triazine, 2-methylimidazolium-isocyanuric acid adduct, 2-phenylimidazolium-isocyanuric acid adduct, 1-aminoethyl-2-methylimidazole, 2-phenyl-4,5-dihydroxylmethylimidazole, 2-phenyl-4-methyl-5-hydroxymethylimidazole, 2-phenyl-4-benzyl-5-hydroxymethylimidazole, and compounds containing two or more imidazole rings obtained by dehydrating any of the foregoing imidazole compounds or condensing them with formaldehyde.

Other useful catalysts include phosphine compounds, i.e., compounds having the general formula $R^3_3P$, wherein each $R^3$ is hydrocarbyl or inertly substituted hydrocarbyl. Dimethylphenyl phosphine, trimethyl phosphine, triethylphosphine and the like are examples of such phosphine catalysts.

The basic catalyst is present in a catalytically effective amount. A suitable amount is typically from about 0.01 to about 10 moles of catalyst per equivalent of thiol and amine hydrogens in the curing agent. A preferred amount is 0.5 to 1 mole of catalyst per equivalent of thiol and amine hydrogens in the curing agent.

In addition to the foregoing ingredients, the reaction mixture may contain various other materials.

One other material that can be present is a free radical initiator, and in particular a thermally decomposable free radical initiator that produces free radicals when heated to a temperature in the range of 50 to 160° C., especially 65 to 120° C. and more preferably 70 to 100° C. Such a thermally-decomposable free radical initiator compound may have a 10 minute half-life temperature of 50 to 120° C. The presence of the free radical initiator is preferred when the ene groups of the polyene compound are not easily curable via a cationic or anionic mechanism, as is often the case when the ene groups are vinyl, vinylaryl or allyl.

The presence of a free radical initiator can permit a dual-mechanism cure to take place, in which the ene reaction with a thiol takes place via a free radical mechanism, and the epoxy cure takes place via an anionic (base-catalyzed) mechanism. Such an approach permits the ene and epoxy reactions to take place sequentially, if desired, by subjecting the reaction mixture first to conditions that promote the formation of free radicals by the free radical initiator, and then to conditions sufficient to cure the epoxy resin component. Alternatively, both curing mechanisms can occur simultaneously by, for example, selecting a heat-activated free radical initiator, and exposing the reaction mixture to an elevated temperature sufficient to activate the free radical initiator and promote the epoxy curing reaction.

Certain ene compounds, in particular those having terminal acrylate and/or methacrylate ene groups, can homopolymerize in the presence of free radicals. Thus, in some embodiments, an excess of ene compounds having acrylate and/or methacrylate ene groups (over the amount of thiol and/or amine groups in the curing agent) can be provided in conjunction with a free radical initiator, to promote a certain amount of homopolymerization of the ene compound in addition to the ene/thiol and/or ene/amine curing reaction. In other embodiments, the ene compound contains, for example, vinyl and/or allyl ene groups, which do not homopolymerize to a significant extent under free radical conditions. In such a case, the presence of a free radical initiator may still be of benefit, as it allows for the dual cure mechanism in which the ene groups react with the thiol and/or amine groups via a free radical mechanism and the epoxy cures via a base-catalyzed mechanism.

Examples of suitable free-radical generators include, for example, peroxy compounds (such as, for example, peroxides, persulfates, perborates and percarbonates), azo compounds and the like. Specific examples include hydrogen peroxide, di(decanoyl)peroxide, dilauroyl peroxide, t-butyl perneodecanoate, 1,1-dimethyl-3-hydroxybutyl peroxide-2-ethyl hexanoate, di(t-butyl)peroxide, t-butylperoxydiethyl acetate, t-butyl peroctoate, t-butyl peroxy isobutyrate, t-butyl peroxy-3,5,5-trimethyl hexanoate, t-butyl perbenzoate, t-butyl peroxy pivulate, t-amyl peroxy pivalate, t-butyl peroxy-2-ethyl hexanoate, lauroyl peroxide, cumene hydroperoxide, t-butyl hydroperoxide, azo bis(isobutyronitrile), 2,2'-azo bis(2-methylbutyronitrile) and the like.

A useful amount of free-radical initiator is 0.2 to 10 parts by weight per 100 parts by weight of ene compound(s).

Another optional component is one or more low equivalent weight ene compounds. Such compound(s) have one or more ene groups as described before and may have, for example, an equivalent weight per ene group of up to about 450, preferably up to about 250. Such low equivalent weight ene compounds can be produced, for example, by capping the hydroxyl groups of a low (up to 125, preferably up to 75) equivalent weight polyol with an unsaturated isocyanate compound such as 3-isopropenyl-α,α-dimethylbenzylisocyanate (TMI) or isocyanatoethylmethacrylate (IEM), an ethylenically unsaturated halide such as vinyl benzyl chloride, an ethylenically unsaturated siloxane such as vinyltrimethoxylsilane, an ethylenically unsaturated epoxide compound, or a hydroxyalkyl acrylate or methacrylate. Low equivalent weight ene compounds also can be produced by capping a polyisocyanate, preferably a diisocyanate, with an isocyanate-reactive capping compound having a hydroxyl group and an ene group as described before. Other useful low equivalent weight ene compounds include divinyl arene compounds such as divinyl benzene.

In some embodiments of the invention, mixtures of high and low equivalent weight ene compounds can be produced by (1) reacting an excess of a polyisocyanate with a polyether polyol, optionally in the presence of a chain extender, to form a quasi-prepolymer containing isocyanate terminated polyether compounds unreacted (monomeric) polyisocyanates and then (2) capping the isocyanate groups with an isocyanate-reactive capping compound having a hydroxyl group and an ene group as described before. This caps the prepolymer molecules and the remaining monomeric isocyanate compounds to produce a mixture of high and low equivalent weight ene compounds.

The reaction mixture may contain other materials in addition to those described above. Such additional materials may include, for example, one or more colorants, one or more solvents or reactive diluents, one or more antioxidants, one or more preservatives, one or more fibers, one or more non-fibrous particulate fillers (including micron- and nano-particles), wetting agents and the like.

The reaction mixture preferably is substantially free of isocyanate compounds. Such compounds, if present at all, preferably constitute at most 1%, more preferably at most 0.5% of the weight of the reaction mixture. Most preferably the reaction mixture contains no measurable amount of isocyanate compounds.

The curing step can be performed in several ways.

In the simplest method, the starting materials are simply combined at ambient temperature and allowed to react. It is generally beneficial to combine the ene compound(s) with the epoxy resin(s) prior to adding the curing agent(s). It is preferred to intimately mix the ene compounds with the epoxy resins prior to adding the curing agent. This mixing can be done, for example, using a high speed laboratory mixer or other suitable device. If any of the ene compound and/or the epoxy resin(s) is solid at ambient temperature, the materials may be heated to melt or soften the solids to facilitate the mixing.

A wide range of curing temperatures can be used, such as, for example, a temperature from 0 to 180° C.

It is often convenient to formulate the starting materials into a two-component system. The first component contains the ene compound(s) and epoxy resin(s) and the second component includes the thiol curing agent(s). It is generally preferred to formulate the basic catalyst into the thiol compound to prevent premature reaction of the ene and/or epoxy compounds. Other ingredients can be formulated into either or both of the components, provided such compounds do not undesirably react therewith.

The reaction mixture is then applied to a substrate and/or introduced into a mold or other container where the cure is to take place.

The curing reactions in many cases proceed at room temperature (about 20° C.), and curing can in such cases be effected without application of external energy. In such cases, the curing agent can simply be mixed with the ene compound(s) and epoxy resin(s) at ambient temperature and the resulting mixture is permitted to cure. The curing reaction is generally exothermic, and a corresponding temperature rise may occur.

A faster and/or more complete cure often is seen at higher temperatures, and for that reason it may be desirable in some embodiments to apply heat to the reaction mixture. This can be done, for example, by (a) heating one or more of the starting materials prior to mixing it with the others to form the reaction mixture and/or (b) heating the reaction mixture after it has been formed by combining the raw materials. If an elevated temperature cure is performed, a suitable curing temperature is 35 to 180° C. A more preferred curing temperature is 50 to 120° C. and a still more preferred curing temperature is 50 to 90° C.

In some embodiments, curing can be performed by exposing the reaction mixture to free radicals and/or conditions that generate free radicals. This can be done, if desired, in addition to performing an elevated temperature cure. Free radicals can be provided in various ways. In some embodiments, the reaction mixture is exposed to a light source, preferably a source of ultraviolet light such as a mercury discharge lamp or a UV-producing LED. The ultraviolet light source may provide UV radiation at an intensity of, for example, 10 mW/cm$^2$ to 10 W/cm$^2$. In other embodiments, the reaction mixture is exposed to a plasma. In still other embodiments, the free radicals are generated by the decomposition of a free radical initiator compound as described before. In the last case, free radicals can be generated thermally by exposing the reaction mixture to an elevated temperature, thereby promoting a free radical curing mechanism as well as accelerating the reaction of the epoxy resin(s) with the curing agent.

Free radical conditions tend to promote the ene-thiol curing reaction but not a epoxy curing reaction. Therefore, it is usually necessary to provide a catalyst for the epoxy curing reaction even if a free radical cure is performed.

In some cases, especially when the ene compound contains acrylate and/or methacrylate ene group, free radical conditions also can promote a homopolymerization of the ene compound(s). When it is desired to promote such a homopolymerization, the reaction mixture preferably includes at least one ene compound having acrylate and/or methacrylate ene groups, and also preferably includes an excess of ene and epoxy groups, relative to the amount of curing agent, such as at least 1.25, up to as many as 10, equivalents of ene and epoxy groups per equivalent of thiol and amine groups in the curing agent. If the homopolymerization of the ene is not desired, it is preferred that the ene compounds are devoid of ene groups such as acrylate and methacrylate groups, which homopolymerize under free radical conditions.

The cured polymer is elastomeric. It typically has an elongation to break of at least 50%, preferably at least 100%, as determined according to ASTM D1708. Elongation to break may be as much as 1000% or more. A typical elongation is 100 to 400%, especially 100 to 250%. Tensile strength is often at least 2000 kPa (about 300 psi), in some embodiments is at least 3500 kPa (about 500 psi), and in especially preferred embodiments is at least 7000 kPa (about 1000 psi). Tensile strength may be 28000 kPa (about 4000 psi) or higher, but is more typically up to 21000 kPa (about 3000 psi) or up to 14000 kPa (about 2000 psi). The elastomer in many embodiments has a Shore A hardness of 60 to 95, more typically 70 to 95 and still more typically 70 to 90, although harder elastomers can be produced. An advantage of this invention is that properties can be tailored through the selection of starting materials, the ratios of starting materials, and to some extent the manner of cure.

The process and elastomer of the invention are very amenable for making a wide variety of coatings, adhesives, sealants and elastomeric materials such as seals and gaskets. Examples of these products include tires, seals, gaskets, tubing, flexible pipes and hoses, sleeves and covers for mechanical equipment, air management ducts, diaphragms, protective coatings for many substrates, shoe soles, wheels, impact absorbers, caulks and sealants, flexible spacers, and a wide range of cushioning products. The invention is very suitable for in-field applications, in which a coating, adhesive, sealant or elastomeric material is formed at the place of use.

The following examples are provided to illustrate the invention, but not limit the scope thereof. All parts and percentages are by weight unless otherwise indicated.

EXAMPLES

A. Synthesis of Acrylate-Terminated Polyether 74.5 g (428 mmol) toluene diisocyanate (TDI, 80/20 mixture of 2,4- and 2,6-isomers) is charged to a dry 2 L 4-neck round bottom flask equipped with overhead stirring, temperature control probe, addition funnel, and nitrogen inlet. The flask and its contents are heated to 80° C., and 827 g (207 mmol) of a 4000 molecular weight, nominally difunctional poly(propylene oxide) diol having 7 µeq/g of terminal unsaturation is added. The solution is stirred for 30 minutes after the diol is added. A drop of dibutyltin dilaurate is added and the reaction stirred for an additional 2 hours. The product is an isocyanate-terminated prepolymer having an isocyanate content of 2.04% by weight, as determined by titration.

881.2 grams of the prepolymer is brought to a temperature of 45° C. 54.3 g (467.6 mmole) of hydroxyethylacrylate (95%) and a drop of dibutyltin diluarate are added. The reaction mixture is stirred at 45° C. until no measurable isocyanate groups remain as observed by FT-IR. The resulting product is a polyether capped with two terminal acrylate (—O—C(O)—CH=CH$_2$) groups per molecule.

B. Production of Phase-Segmented Elastomer 150.00 g of the acrylate-terminated polyether produced in A above and 100.00 g of a 180 epoxy equivalent weight diglycidyl ether of bisphenol A (D. E. R. 383, from The Dow Chemical Company) are mixed on a high-speed laboratory mixture until homogeneous. Separately, 84 g trimethylolpropane tris(mercaptopropionate) (Sigma Aldrich technical grade) is mixed with 318 mg (0.33 mole-% based on thiol groups) of 1,8-diazabicyclo[5.4.0]undec-7-ene (DBU, Sigma Aldrich technical grade). The thiol/catalyst mixture is then mixed with the acrylate-terminated prepolymer/epoxy resin mixture on the high speed mixer to produce a clear mixture. These proportions of starting materials provides about 1.15 equivalents of thiol groups per combined equivalents of acrylate and epoxide groups. A portion of the mixture is poured into a mold warmed to 50° C. The filled mold is then placed in a 50° C. oven overnight. A tack-free plaque is obtained. The cured plaque contains 25% by weight cured epoxy resin, calculated as described before.

The plaque has a tensile strength of 8950 kPa (about 1300 psi) and an elongation at break of 138% (each as measured per ASTM D1708). The Shore A hardness is 90.

A 10 mg sample of the cured plaque is evaluated by differential scanning calorimetry by equilibrating the sample at −90° C. and heating to 200° C. at the rate of 10°

C./minute. Two glass transition temperatures are elicited, one at about −50° C. and a second one at about 25° C.

A 10 cm×10 cm section of the cured plaque is placed in distilled water and heated at 70° C. for 14 days. The sample is then dried and its tensile strength, elongation and Shore A hardness are measured. The tensile strength is 7764 kPa (1126 psi), a reduction of only 13%. Elongation is 186%. Shore A hardness is not materially changed. The sample gains only 2.5% in mass, which is consistent with little reaction with and/or absorption of water.

This system also cures at room temperature to form an elastomer having similar properties, although longer curing times are needed.

Examples 2-5

To produce Example 2, 150.00 g of an acrylate-terminated polyether as in Example 1A above and 100.00 g of a 180 epoxy equivalent weight diglycidyl ether of bisphenol A (D. E. R. 383, from The Dow Chemical Company) are mixed on a high-speed laboratory mixture until homogeneous. Separately, 84 g trimethylolpropane tris(mercaptopropionate) (Sigma Aldrich technical grade) is mixed with 0.45 mole-% (based on trimethylolpropane tris(mercaptopropionate)) of 1,8-diazabicyclo[5.4.0]undec-7-ene (DBU, Sigma Aldrich technical grade). The thiol/catalyst mixture is then blended with the acrylate-terminated prepolymer/epoxy resin mixture on the high speed mixer to produce a clear blend. About 20 grams are poured into a scintillation vial, which is sealed and placed in a block of insulating foam. The temperature of the reaction mixture is monitored with a thermocouple to determine the peak temperature generated by the exothermic curing reaction, as well as the time required to reach the peak exotherm temperature. The peak exotherm temperature of 110° C. is reached after about 10 minutes.

Example 3 is performed in the same manner, except the amount of DBU catalyst is reduced to 0.33 mole-%. The peak exotherm temperature of 85° C. is reached after about 20-25 minutes. This indicates a much slower cure at this lower catalyst level, compared to Example 2.

For Example 4, the DBU catalyst is replaced with 1 mole-% dimethylphenyl phosphine (DMPP). The peak exotherm temperature of 111° C. is reached after about 6 minutes. For Example 5, the DBU catalyst is replaced with 0.5 mole-% DMPP. The peak exotherm temperature of 118° C. is reached after about 2½ minutes. In these experiments, DMPP is found to provide a much faster cure than the DBU.

Examples 6-8

Example 2 is repeated three times, each time replacing the DBU catalyst with 1,4-diazabicyclo[2.2.2]octane (DABCO). For Examples 6-8, 0.33, 0.25 and 0.22 mole-percent, respectively, of the triethylenediamine catalyst (based on the polythiol) are used. At each of these levels, the triethylenediamine catalyst provides an induction period in which little or no exotherm is seen, followed by a rapid increase in temperature indicative of a strong curing reaction. For Example 6, very little exotherm is seen for almost 15 minutes, and then the temperature rises rapidly to a peak exotherm of 111° C. after about 21 minutes. For Example 7, the temperature does not reach 40° C. for almost 60 minutes, and the peak exotherm of about 87° C. is seen after about 62 minutes. For Example 8, the time to reach 40° C. is over 80 minutes and the peak exotherm temperature of about 72° C. is seen after almost 110 minutes.

Example 9

200.00 g of an acrylate-terminated polyether as produced in Example 1A above and 100.00 g of a 180 epoxy equivalent weight diglycidyl ether of bisphenol A (D. E. R. 383, from The Dow Chemical Company) are mixed on a high-speed laboratory mixture until homogeneous. Separately, 64.96 g of pentaerythritol tetra(mercaptoacetate) (Sigma Aldrich technical grade) is mixed with 300 mg of 1,8-diazabicyclo[5.4.0]undec-7-ene (DBU, Sigma Aldrich technical grade). The thiol/catalyst mixture is then mixed and cured in the manner described in Example 1B.

The plaque has a tensile strength of 6550 kPa (950 psi) and percent elongation at break of 164% (as measured per ASTM D1708). The Shore A hardness is 70.

As with Example 1, this sample is also curable at room temperature.

Example 10

304.7 grams of an isocyanate-terminated prepolymer as described in Example 1A is brought to a temperature of 45° C. 9.25 g of allyl alcohol and a drop of dibutyltin diluarate are added. The reaction mixture is stirred at 45° C. until no measurable isocyanate groups remain as observed by FT-IR. The resulting product is a polyether capped with two terminal allyl ether (—O—$CH_2$—CH=$CH_2$) groups per molecule.

A phase-segmented elastomer is made in the general manner described in Example 2, using as ingredients 15 g of the allyl-terminated polyether, 10.00 g of a 180 epoxy equivalent weight diglycidyl ether of bisphenol A (D. E. R. 383, from The Dow Chemical Company), 8.35 g trimethylolpropane tris(mercaptopropionate) (Sigma Aldrich technical grade), 32 mg (1 mole-% based on trimethylolpropane tris(mercaptopropionate) of 1,8-diazabicyclo[5.4.0]undec-7-ene (DBU, Sigma Aldrich technical grade) and 333 mg of t-butyl peroxide. The mixture is cured overnight at 80° C. in an oven.

The t-butyl peroxide decomposes at the curing temperature to form free radicals. As a result, this system is believed to engage in both a free radical cure (between the ene groups and thiol groups) and a base-catalyzed cure (between the epoxy groups and the thiol groups. Some of the ene/thiol reaction also may be base-catalyzed. The product has a tensile strength of 9200 kPa (1335 psi) and an elongation to break of 200%. The material exhibits two glass transition temperatures, one at 34° C. and one at about −50° C.

Micrographs are taken of the resulting elastomer using atomic force microscopic methods. A two-phase material is seen, in which the cured epoxy resin is mainly in the form of 0.5-1 mm phases dispersed in a continuous phase which consists mainly of the polyether.

This system is also curable at room temperature.

Examples 11-14

An acrylate-terminated polyether having an equivalent weight per terminal acrylate group of 1947 is made in the general manner described in Example 1A. Elastomer Examples 11-14 are made from this acrylate-terminated polyether, using formulations as set forth in Table 1 below. In each case, the acrylate-terminated polyether is mixed with the epoxy resin in a high-speed laboratory mixture, and then a mixture of the thiol and catalyst are stirred in. A portion of the resulting reaction mixture is poured into a mold warmed to 50° C. The filled mold is then placed in a 50° C. oven overnight. A tack-free plaque is obtained. Tensile strength, elongation, tensile modulus and Shore A hardness are as reported in Table 1.

TABLE 1

| | Parts by weight | | | |
|---|---|---|---|---|
| Ingredient | Ex. 11 | Ex. 12 | Ex. 13 | Ex. 14 |
| Acrylate-terminated polyether | 20 | 20 | 15 | 35 |
| DER 383 Epoxy resin | 4.1 | 6.667 | 9.59 | 35 |
| Trimethylolpropane tri(thiopropionate) | 4.39 | 6.29 | 8.1 | 28.22 |
| DBU catalyst | 0.017 | 0.024 | 0.031 | 0.107 |
| Properties | | | | |
| Tensile Str, kPa (psi) | 2650 (385) | 3300 (477) | 6975 (1012) | 11,175 (1621) |
| Elongation, % | 187 | 159 | 122 | 120 |
| Tensile Modulus, kPa (psi) | 3515 (510) | 4710 (683) | 10915 (1583) | 26025 (3775) |
| Shore A hardness | 63 | N.D. | 79 | 89 |

These systems are also curable at room temperature.

Examples 15-18

An acrylate-terminated polyether having an equivalent weight per terminal acrylate group of 1947 is made in the general manner described in Example 1A. Elastomer Examples 15-18 are made from this acrylate-terminated polyether, using formulations as set forth in Table 2 below. In each case, the acrylate-terminated polyether is mixed with the epoxy resin in a high-speed laboratory mixture, and then a mixture of the thiol and catalyst are stirred in. A portion of the resulting reaction mixture is poured into a mold warmed to 50° C. The filled mold is then placed in a 80° C. oven overnight. Tensile strength, elongation, tensile modulus and Shore A hardness are as reported in Table 2.

TABLE 2

| | Parts by weight | | | |
|---|---|---|---|---|
| Ingredient | Ex. 15 | Ex. 16 | Ex. 17 | Ex. 18 |
| Acrylate-terminated polyether | 20 | 50 | 35 | 35 |
| DER 383 Epoxy resin | 4.1 | 31.97 | 35 | 65 |
| Trimethylolpropane tri(thiopropionate) | 1.97 | 6.29 | 14.11 | 14.39 |
| Ethylene glycol di(thiopropionate) | 2.19 | 13.50 | 12.65 | 12.91 |
| DBU catalyst | 0.055 | 0.278 | 0.291 | 0.198 |
| Properties | | | | |
| Tensile Str, kPa (psi) | 3010 (437) | 9045 (1312) | 10570 (1533) | 19300 (2800) |
| Elongation, % | 453 | 354 | 300 | 258 |
| Tensile Modulus, kPa (psi) | 1965 (285) | 6075 (881) | 14730 (2137) | 36400 (5281) |
| Shore A hardness | N.D. | N.D. | 80-85 | N.D. |
| Tear Strength, N/mm | N.D. | N.D. | 30 | N.D. |

The abrasion resistance of elastomer Example 17 is evaluated for 1000 cycles on a Taber abrader equipped with 1 kg weight and H22 wheels. Example 17 loses less than 100 mg of mass.

These systems are all curable at room temperature.

Examples 19-21

An acrylate-terminated polyether having an equivalent weight per terminal acrylate group of 1230 is made in the general manner described in Example 1A, by capping a 2000-molecular weight poly(tetramethylene oxide) diol with toluene diisocyanate to form an isocyanate-terminated prepolymer, and then capping the isocyanate groups with hydroxyethylacrylate.

Elastomer Examples 19-21 are made from this acrylate-terminated polyether, using formulations as set forth in Table 3 below. In each case, the acrylate-terminated polyether is mixed with the epoxy resin in a high-speed laboratory mixture, and then a mixture of the thiol and catalyst are stirred in. A portion of the resulting reaction mixture is poured into a mold warmed to 50° C. The filled mold is then placed in a 50° C. oven overnight. A tack-free plaque is obtained. Tensile strength and elongation are as reported in Table 3.

TABLE 3

| Ingredient | Ex. 19 | Ex. 20 | Ex. 21 |
|---|---|---|---|
| Acrylate-terminated polyether | 20 | 20 | 20 |
| DER 383 Epoxy resin | 0 | 2.22 | 13.33 |
| Trimethylolpropane tri(thiopropionate) | 2.70 | 3.80 | 12.0 |
| DBU catalyst | 0.014 | 0.014 | 0.045 |
| Properties | | | |
| Tensile Str, kPa (psi) | 3268 (474) | 3668 (532) | 7095 (1029) |
| Elongation, % | 378 | 686 | 188 |
| Tensile Modulus, kPa (psi) | 2820 (409) | 1489 (216) | 19,954 (2894) |
| Shore A hardness | N.D. | 75 | 85 |

As before, these systems are all curable at room temperature.

Examples 22-25

An acrylate-terminated polyether having an equivalent weight per terminal acrylate group of 1230 is made in the general manner described in Example 1A, by capping a 2000-molecular weight poly(tetramethylene oxide) diol with toluene diisocyanate to form an isocyanate-terminated prepolymer, and then capping the isocyanate groups with hydroxyethylacrylate.

Elastomer Examples 22-25 are made from this acrylate-terminated polyether, using formulations as set forth in Table 4 below. In each case, the acrylate-terminated polyether is mixed with the epoxy resin in a high-speed laboratory mixture, and then a mixture of the thiol and catalyst are stirred in. A portion of the resulting reaction mixture is poured into a mold warmed to 50° C. The filled mold is then placed in a 50° C. oven overnight. A tack-free plaque is obtained. Tensile strength and elongation are as reported in Table 4.

TABLE 4

| Ingredient | Parts by weight | | | |
|---|---|---|---|---|
| | Ex. 22 | Ex. 23 | Ex. 24 | Ex. 25 |
| Acrylate-terminated polyether | 20 | 20 | 20 | 20 |
| Diglycidyl ether of 1,4-butane diol | 1.05 | 2.22 | 5.0 | 8.57 |
| Pentaerythritol tetra(thiopropionate) | 3.26 | 4.67 | 8.03 | 12.35 |
| DBU catalyst | 0.013 | 0.015 | 0.014 | 0.015 |
| Properties | | | | |
| Tensile Str, kPa (psi) | 3565 (517) | 1730 (251) | 1565 (227) | 1165 (169) |
| Elongation, % | 350 | 313 | 322 | 174 |

As before, these systems are curable at room temperature.

Examples 26-29

Elastomer Examples 26-29 are made from an acrylate-terminated polyether, using formulations as set forth in Table 5 below. In each case, the acrylate-terminated polyether is mixed with the epoxy resin in a high-speed laboratory mixture, and then a mixture of the thiol and catalyst are stirred in. A portion of the resulting reaction mixture is poured into a mold warmed to 50° C. The filled mold is then placed in a 50° C. oven over about three days. A tack-free plaque is obtained in each case. Tensile strength and elongation are as reported in Table 5.

TABLE 5

| Ingredient | Parts by weight | | | |
|---|---|---|---|---|
| | Ex. 26 | Ex. 27 | Ex. 28 | Ex. 29 |
| Acrylate-terminated polyether | 55 | 55 | 50 | 50 |
| DER 383 epoxy resin | 36.67 | 36.67 | 33.33 | 33.33 |
| Trimethylolpropane tri(thiopropionate) | 22.96 | 15.308 | 25.05 | 20.88 |
| (2,3-di((2-mercaptoethyl)thio)1-propanethiol | 5.00 | 10.01 | 0 | 0 |
| Fatty acid thiol | 0 | 0 | 6.90 | 17.24 |
| DBU catalyst | 0.116 | 0.116 | 0.210 | 0.105 |
| Properties | | | | |
| Tensile Strength, kPa (psi) | 7825 (1135) | 7720 (1120) | 4675 (678) | 6785 (984) |
| Elongation, % | 107 | 104 | 201 | 174 |
| Shore A hardness | 84 | 85 | 76 | 78 |
| Hard segment Tg, ° C. | 38 | 41 | 28 | 32 |

Examples 30-33

An acrylate-terminated polyether having an equivalent weight per terminal acrylate group of 2496 is made in the general manner described in Example 1A, by capping a 6000 molecular weight 20% ethylene oxide capped poly(propylene oxide)triol with TDI to form an isocyanate-terminated prepolymer, and then capping the isocyanate groups with hydroxyethylacrylate.

Elastomer Examples 30-33 are made from this acrylate-terminated polyether, using formulations as set forth in Table 6 below. In each case, the acrylate-terminated polyether is mixed with the epoxy resin in a high-speed laboratory mixture, and then a mixture of the thiol and catalyst are stirred in. A portion of the resulting reaction mixture is poured into a mold warmed to 50° C. The filled mold is then placed in an 50° C. oven overnight. A tack-free plaque is obtained. Tensile strength and elongation are as reported in Table 7.

TABLE 6

| Ingredient | Parts by weight | | | |
|---|---|---|---|---|
| | Ex. 30 | Ex. 31 | Ex. 32 | Ex. 33 |
| Acrylate-terminated polyether | 15 | 10 | 15 | 15 |
| DER 383 Epoxy Resin | 9.59 | 6.39 | 15.0 | 15 |
| Trimethylolpropane tri(thiopropionate) | 3.94 | 5.26 | 5.93 | 11.87 |
| Ethylene glycol di(thiopropionate) | 3.53 | 0 | 5.32 | 0 |
| DBU catalyst | 0.059 | 0.036 | 0.088 | 0.082 |
| Properties | | | | |
| Tensile Str, kPa (psi) | 2695 (391) | 4315 (626) | 5655 (820) | 7620 (1105) |
| Elongation, % | 195 | 129 | 243 | 114 |
| Shore A hardness | 70 | 80 | 79 | 89 |

Examples 34-39

An acrylate-terminated polyether having an equivalent weight per terminal acrylate group of 1968 is made in the general manner described in Example 1A, by capping a 4000 dalton poly(propylene oxide) diol with a 20% ethylene oxide cap with TDI to form an isocyanate-terminated prepolymer, and then capping the isocyanate groups with hydroxyethylacrylate.

Elastomer Examples 34-39 are made from this acrylate-terminated polyether, using formulations as set forth in Table 7 below. In each case, the acrylate-terminated polyether is mixed with the epoxy resin and varying amounts of poly(propylene oxide) based diacrylate (as in Example 1) in a high-speed laboratory mixture, and then a mixture of the thiol and catalyst are stirred in. A portion of the resulting reaction mixture is poured into a mold warmed to 50° C. The filled mold is then placed in an 50° C. oven overnight. A tack-free plaque is obtained in each case. Tensile strength and elongation are as reported in Table 7.

TABLE 7

| | Parts by weight | | | | | |
|---|---|---|---|---|---|---|
| | Ex. 34 | Ex. 35 | Ex. 36 | Ex. 37 | Ex. 38 | Ex. 39 |
| Ingredient | | | | | | |
| Acrylate-terminated 20% EO polyether | 0 | 12.5 | 25 | 33 | 50 | 100 |
| Example 1 (100% PO) | 100 | 87.5 | 75 | 67 | 50 | 0 |
| DER 383 Epoxy Resin | 100 | 100 | 100 | 100 | 100 | 100 |
| Trimethylolpropane tri(thiopropionate) | 80.6 | 80.6 | 80.6 | 80.6 | 80.6 | 80.6 |
| DBU catalyst | 0.3 | 0.3 | 0.3 | 0.3 | 0.3 | 0.3 |

TABLE 7-continued

| | Parts by weight | | | | | |
|---|---|---|---|---|---|---|
| | Ex. 34 | Ex. 35 | Ex. 36 | Ex. 37 | Ex. 38 | Ex. 39 |
| Properties | | | | | | |
| Tensile Str, MPa (psi) | 11.7 (1694) | 11.8 (1716) | 12.8 (1858) | 13.6 (1978) | 11.0 (1591) | 10.7 (1559) |
| Elongation, % | 125 | 129 | 140 | 153 | 145 | 154 |
| Shore A hardness | | 89 | 89 | 90 | | 90 |

These systems are also curable at room temperature.

Examples 40-43

Example 40 is prepared by mixing 6 grams of an acrylate-terminated polyether as prepared in Example 1B above, 4 grams of a low molecular weight polyene compound having the structure:

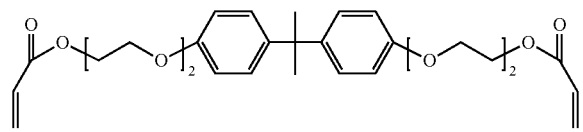

and 10 grams of the D. E. R. 383 epoxy resin until homogeneous. Separately, 9.86 g trimethylolpropane tris(mercaptopropionate) is mixed with 37 mg of DBU. The mixture are combined and cured as described in Example 1.

Example 41 is prepared in the same manner, except dimethylphenylphosphine is substituted for the DBU catalyst.

Example 42 is prepared in the same manner as Example 40, except the amount of acrylate-terminated polyether is increased to 8 grams and the amount of the low molecular weight polyene compound is reduced to 2 grams.

Example 43 is prepared in the same manner as Example 42, except dimethylphenylphosphine is substituted for the DBU catalyst.

Results of physical property measurement are as indicated in Table 8.

TABLE 8

| | Ex. 40 | Ex. 41 | Ex. 42 | Ex. 43 |
|---|---|---|---|---|
| Tensile Str, MPa (psi) | 12.1 (1761) | 13.7 (1981) | 12.2 (1773) | 13.0 (1881) |
| Elongation, % | 161 | 165 | 151 | 176 |
| Tensile Modulus, MPa (psi) | 147 (23,300) | 170 (24600) | 106 (15400) | 162 (23500) |

Examples 44 and 45

An acrylate-terminated prepolymer is made and capped with hydroxyethylacrylate as described in Example 1A to form an ene-terminated polyether. This material is used to make Example 44 as described below.

A ene-terminated polyether is made in the same fashion, except the polyether in this case is higher unsaturation (140 µeq/g), 4000 molecular weight poly(propylene oxide)diol. This material is used to make Example 45 as described below.

To make each of Examples 44 and 45, 75 parts of the acrylate-terminated polyether and 50 parts of a 180 epoxy equivalent weight diglycidyl ether of bisphenol A (D. E. R. 383, from The Dow Chemical Company) are mixed on a high-speed laboratory mixture until homogeneous. Separately, 99.4 parts of 2,3-bis((2-mercaptoethyl)thio)-1-propanethiol and 0.6 parts of 1,8-diazabicyclo[5.4.0]undec-7-ene (DBU, Sigma Aldrich technical grade) are mixed. The acrylate-terminated prepolymer/epoxy resin mixture is then mixed with the thiol/catalyst mixture at a 6.45:1 weight ratio on the high speed mixer to produce a clear mixture. A portion of the mixture is poured into a mold warmed to 50° C. The filled mold is then placed in a 50° C. oven overnight. A tack-free plaque is obtained.

Example 45 has a tensile strength of 2.7 MPa and an elongation to break of 154%. Example 44 has a tensile strength of 3.5 MPa and an elongation to break of 277%. The higher tensile strength of Example 44 compared to Example 45 is believed to be due to the use of the low unsaturation polyether polyol starting material. The lower quantity of monofunctional species in the polyether polyol, and hence in the ene-terminated polyether, is believed to reduce the occurrence of chain defects in the cured elastomer, which increases tensile strength and in this case increases elongation as well.

What is claimed is:

1. A process for forming an elastomeric polymer, comprising a) forming a reaction mixture containing 1) at least one ene-terminated polyether having a molecular weight of 4,000 to 8,000, 2 to 6 aliphatic carbon-carbon double bonds capable of reaction with a thiol group, wherein at least one of said aliphatic carbon-carbon double bonds is separated from each other said aliphatic carbon-carbon double bond by an aliphatic spacer group having a weight of at least 1000 atomic mass units, 2) from 20 to 150 parts by weight, per 100 parts by weight of component 1), of at least one epoxy resin having an average of at least 1.5 epoxide groups per molecule and an epoxy equivalent weight of up to 1000, 3) at least one curing agent having at least two thiol groups, 4) at least one basic catalyst, and b) curing the reaction mixture to form the polymeric elastomer.

2. The process of claim 1, wherein the epoxy resin has an epoxy equivalent weight of up to 250.

3. The process of claim 2, wherein the curing agent includes at least one polythiol compound that contains from 2 to 4 thiol groups, or a mixture of two or more polythiol compounds that each contain 2 to 4 thiol groups, and the polythiol compound(s) have a thiol equivalent weight of 50 to 250.

4. The process of claim 2 wherein the base catalyst includes at least one tertiary amine compound, at least one cyclic amidine catalyst, at least one tertiary phosphine compound or a mixture of any two or more thereof.

5. The process of claim 2, wherein the reaction mixture further includes at least one thermally-decomposable free radical initiator compound.

6. The process of claim 2, wherein the curing agent provides 0.75 to 1.25 equivalents of thiol groups per equivalent of epoxide and ene groups present in the reaction mixture.

7. The process of claim 2 wherein the terminal aliphatic carbon-carbon double bonds are vinyl (—CH=CH$_2$) groups.

8. The process of claim 2 wherein the terminal aliphatic carbon-carbon double bonds are acrylate groups.

9. The process of claim 2, wherein step b) is performed at a temperature of 0 to 180° C.

10. The process of claim 2, wherein step b) includes a free-radical reaction of the ene-terminated polyether and a thiol curing agent, and a base-catalyzed reaction between the epoxy resin and a thiol curing agent.

11. An elastomeric polymer made in accordance with claim 1.

12. The elastomeric polymer of claim 11, which has an elongation to break of at least 50% and a tensile strength of at least 3500 kPa.

13. The elastomeric polymer of 12, which has a continuous phase having a glass transition temperature of no greater than −20° C. and a disperse phase having a glass transition temperature of at least 20° C., wherein the continuous phase includes a reaction product of the ene-terminated polyether and a portion of the thiol curing agent, and the disperse phase includes a reaction product of the epoxy resin and the thiol curing agent.

14. An elastomeric polymer which has a continuous phase having a glass transition temperature of no greater than −20° C. and a disperse phase having a glass transition temperature of at least 20° C., wherein the continuous phase includes a reaction product of an ene-terminated polyether having a molecular weight of 4,000 to 8,000, 2 to 6 aliphatic carbon-carbon double bonds capable of reaction with a thiol group, wherein at least one of said aliphatic carbon-carbon double bonds is separated from each other said aliphatic carbon-carbon double bond by an aliphatic spacer group having a weight of at least 1000 atomic mass units, and a thiol curing agent, and the disperse phase includes a reaction product of an epoxy resin and a thiol curing agent.

15. The elastomeric polymer of claim 14, which has an elongation to break of at least 50% and a tensile strength of at least 3500 kPa.

16. The elastomeric polymer of claim 15, which has an elongation to break of at least 100%.

* * * * *